US007241101B2

(12) United States Patent
Bauer et al.

(10) Patent No.: US 7,241,101 B2
(45) Date of Patent: Jul. 10, 2007

(54) DOUBLE ACTION GRAB FORK AND METHOD

(75) Inventors: Lloyd Bauer, Ogdensburg, WI (US); Joseph W. Langenfeld, Onawa, IA (US); Neal W. Westendorf, Dakota Dunes, SD (US)

(73) Assignee: Westendorf Manufacturing Company, Inc., Onawa, IA (US)

( * ) Notice: Subject to any disclaimer, the term of this patent is extended or adjusted under 35 U.S.C. 154(b) by 0 days.

(21) Appl. No.: 10/157,740

(22) Filed: May 28, 2002

(65) Prior Publication Data

US 2003/0223852 A1    Dec. 4, 2003

(51) Int. Cl.
*B66C 23/00* (2006.01)
(52) U.S. Cl. .................. 414/726; 414/729; 414/741
(58) Field of Classification Search ................ 414/697, 414/715, 721, 724, 726, 729, 732, 741; 37/405; 172/298
See application file for complete search history.

(56) References Cited

U.S. PATENT DOCUMENTS

| | | | |
|---|---|---|---|
| 2,326,338 A | 8/1943 | Drott et al. | |
| 2,501,243 A | 3/1950 | Snyder | |
| 2,812,595 A | 11/1957 | Drott et al. | |
| 3,077,999 A | 2/1963 | Svoboda | |
| 3,209,474 A | 10/1965 | Artman | |
| 3,243,905 A | 4/1966 | Ulrich | |
| 3,344,540 A | 10/1967 | Ulrich | |
| 3,421,642 A | 1/1969 | Carter | |
| 3,451,575 A | 6/1969 | Petro | |
| 3,455,477 A | 7/1969 | Blair | |
| 3,493,134 A * | 2/1970 | Ahrens | 414/732 |
| 3,512,665 A | 5/1970 | Westendorf | |
| 3,700,131 A * | 10/1972 | Westendorf | 414/704 |
| 3,701,443 A | 10/1972 | Lely | |
| 3,991,890 A | 11/1976 | Frank | |
| 4,033,469 A | 7/1977 | Frank | |
| 4,051,962 A | 10/1977 | Westendorf | |
| 4,085,856 A | 4/1978 | Westendorf | |
| 4,106,646 A * | 8/1978 | Weisgerber | 414/732 |
| 4,345,870 A | 8/1982 | Anderson et al. | |
| 4,538,955 A | 9/1985 | Langenfeld et al. | |
| 4,565,485 A | 1/1986 | Wilman | |
| 4,566,844 A | 1/1986 | Campin | |
| 4,606,692 A | 8/1986 | Langenfeld et al. | |
| 4,787,811 A | 11/1988 | Langenfeld et al. | |
| 4,790,084 A | 12/1988 | Anderson et al. | |

(Continued)

*Primary Examiner*—Patrick Mackey
(74) *Attorney, Agent, or Firm*—Merchant & Gould P.A.

(57) ABSTRACT

A double action grab fork is provided according to the invention. The double action grab fork includes an upper grab member, a lower grab member, and an arm. The upper grab member has an upper grab end and an upper grab body. The lower grab member has a lower grab end and a lower grab body. The upper grab end and the lower grab end are constructed for grasping an article. The arm has an upper end and a lower end. The upper end of the arm is rotatably attached to the upper grab body to allow rotation of the upper grab member relative to the upper end of the arm. The lower end of the arm is rotatably attached to the lower grab body to allow rotation of the lower grab body relative to the lower end of the arm. A grab teeth assembly for use with a bucket is provided, and a method for using the double action grab fork is provided.

16 Claims, 9 Drawing Sheets

U.S. PATENT DOCUMENTS

| | | |
|---|---|---|
| 4,797,051 A | 1/1989 | Langenfeld et al. |
| 4,859,130 A | 8/1989 | Langenfeld et al. |
| 4,890,400 A | 1/1990 | Long |
| 4,915,575 A | 4/1990 | Langenfeld et al. |
| 4,925,359 A * | 5/1990 | Dunnegan ................... 414/722 |
| 4,930,974 A | 6/1990 | Langenfeld et al. |
| 4,968,213 A | 11/1990 | Langenfeld et al. |
| 4,995,760 A | 2/1991 | Probst et al. |
| 5,121,557 A | 6/1992 | Moore |
| 5,314,292 A * | 5/1994 | Holopainen ................. 414/724 |
| 5,466,113 A | 11/1995 | Norberg |
| 5,639,205 A * | 6/1997 | Kaczmarczyk et al. ..... 414/723 |
| 5,797,461 A * | 8/1998 | Noble ........................ 172/200 |
| 5,957,650 A * | 9/1999 | Rollo ......................... 414/724 |
| 5,997,237 A | 12/1999 | Langenfeld et al. |
| 6,074,160 A * | 6/2000 | Brumbaugh et al. ........ 414/704 |
| 6,109,859 A * | 8/2000 | Domann ..................... 414/729 |
| 6,142,724 A | 11/2000 | Hirooka et al. |
| 6,267,547 B1 * | 7/2001 | Lund .......................... 414/697 |
| 6,287,072 B1 * | 9/2001 | Wasilas ...................... 414/729 |
| 6,374,520 B1 | 4/2002 | Westendorf et al. |

* cited by examiner

DOUBLE ACTION GRAB FORK AND METHOD

FIELD OF THE INVENTION

The invention relates to a double action grab fork and to a method for using a double action grab fork. In particular, the grab fork is constructed to provide a rotation action and a lever action during use. The invention additionally relates to a grab fork teeth assembly that provides lateral stability.

BACKGROUND OF THE INVENTION

Material handling vehicles such as front end loaders, tractor loaders, skid steer loaders, etc. generally have a pair of booms provided thereon to which various attachments are secured. Many material handling vehicles have a bucket attached to the booms to facilitate movement of material such as dirt, gravel, snow, feed, and wet materials. When the material handling vehicle is used for moving bales of hay, the bucket is often replaced with a grab fork attachment or a grab fork attachment is provided on the bucket. See U.S. Pat. No. 3,700,131 to Westendorf.

The invention is an improvement over prior grab fork attachments.

SUMMARY OF THE INVENTION

A double action grab fork is provided according to the invention. The double action grab fork includes an upper grab member, a lower grab member, and an arm. The upper grab member has an upper grab end and an upper grab body. The lower grab member has a lower grab end and a lower grab body. The upper grab end and the lower grab end are constructed for grasping an article. The arm has an upper end and a lower end. The upper end of the arm is rotatably attached to the upper grab body to allow rotation of the upper grab member relative to the upper end of the arm. The lower end of the arm is rotatably attached to the lower grab body to allow rotation of the lower grab body relative to the lower end of the arm.

The double action grab folk provides for a movement of the upper grab member relative to the lower grab member that can be considered as a first action or lever action and a second action or rotation action. The lever action is achieved by rotating the arm relative to the lower grab member. The rotation action is achieved by rotating the upper grab member relative to the arm.

A double action grab fork for use with a bucket on a front end loader is provided according to the invention. The double action grab fork assembly includes a grab teeth assembly, a frame assembly, a lever arm, and a rotation arm. The grab teeth assembly includes a teeth support constructed to rotate between a first position and a second position, and a plurality of teeth extending from the teeth support. The frame assembly includes a bucket fastener constructed for connecting the frame assembly to a bucket, and a frame assembly hydraulic cylinder connection for attaching the frame assembly to a hydraulic cylinder. The lever arm has a first lever arm end and a second lever arm end. The first lever arm end is rotatably attached to the teeth support, and the second lever arm end is rotatably attached to the frame assembly. The rotation arm has a first rotation arm end and a second rotation arm end. The first rotation arm end is attached to the teeth support, and the second rotation arm end includes a rotation arm hydraulic cylinder connection for attaching the rotation arm to a hydraulic cylinder.

The grab fork can include a hydraulic cylinder having a first hydraulic cylinder end and a second hydraulic cylinder end. When the grab fork includes a hydraulic cylinder, the first hydraulic cylinder end can be attached to the rotation arm hydraulic cylinder connection and the second hydraulic cylinder end can be attached to the frame assembly hydraulic cylinder connection.

A grab teeth assembly is provided according to the invention. The grab teeth assembly includes a teeth support and a plurality of teeth extending from the teeth support. The plurality of teeth include teeth formed from a pair of teeth members where each member has a first end and a second end. The first ends of the teeth members are attached together and the second ends of the teeth members are separated and attached to the teeth support. The attachments can be weld attachments.

A method for operating the double action grab fork is provided according to the invention. The method includes a step of extending the hydraulic cylinder to move the double action grab fork between an open position and a closed position. Retracting the hydraulic cylinder causes the double action grab fork to move between a closed position and an open position.

DETAILED DESCRIPTION OF THE INVENTION

Figure 1:
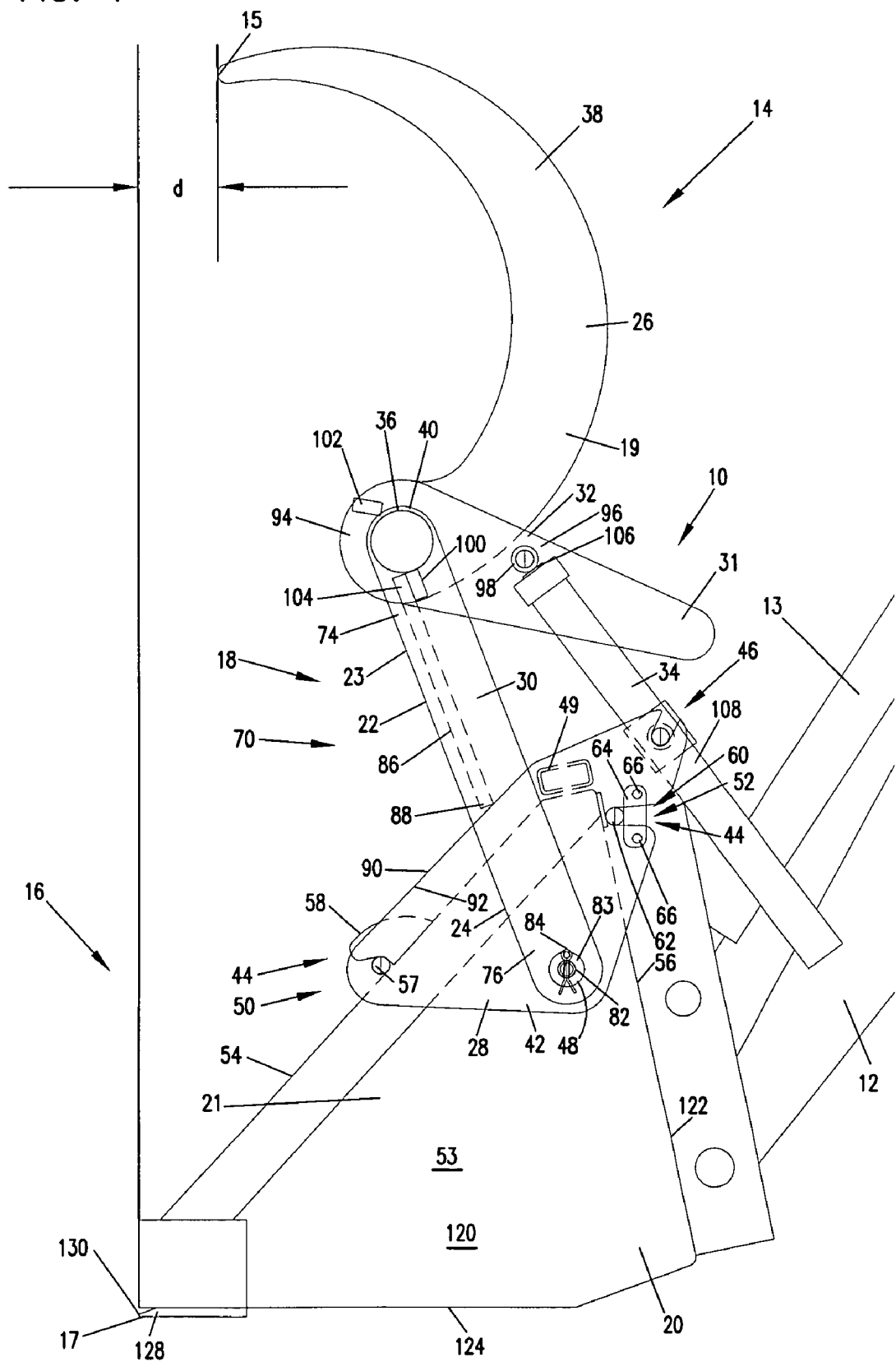
FIG. 1 is a perspective view of a double action grab fork provided on a front end loader according to the principles of the present invention shown in an open position.
Figure 2:
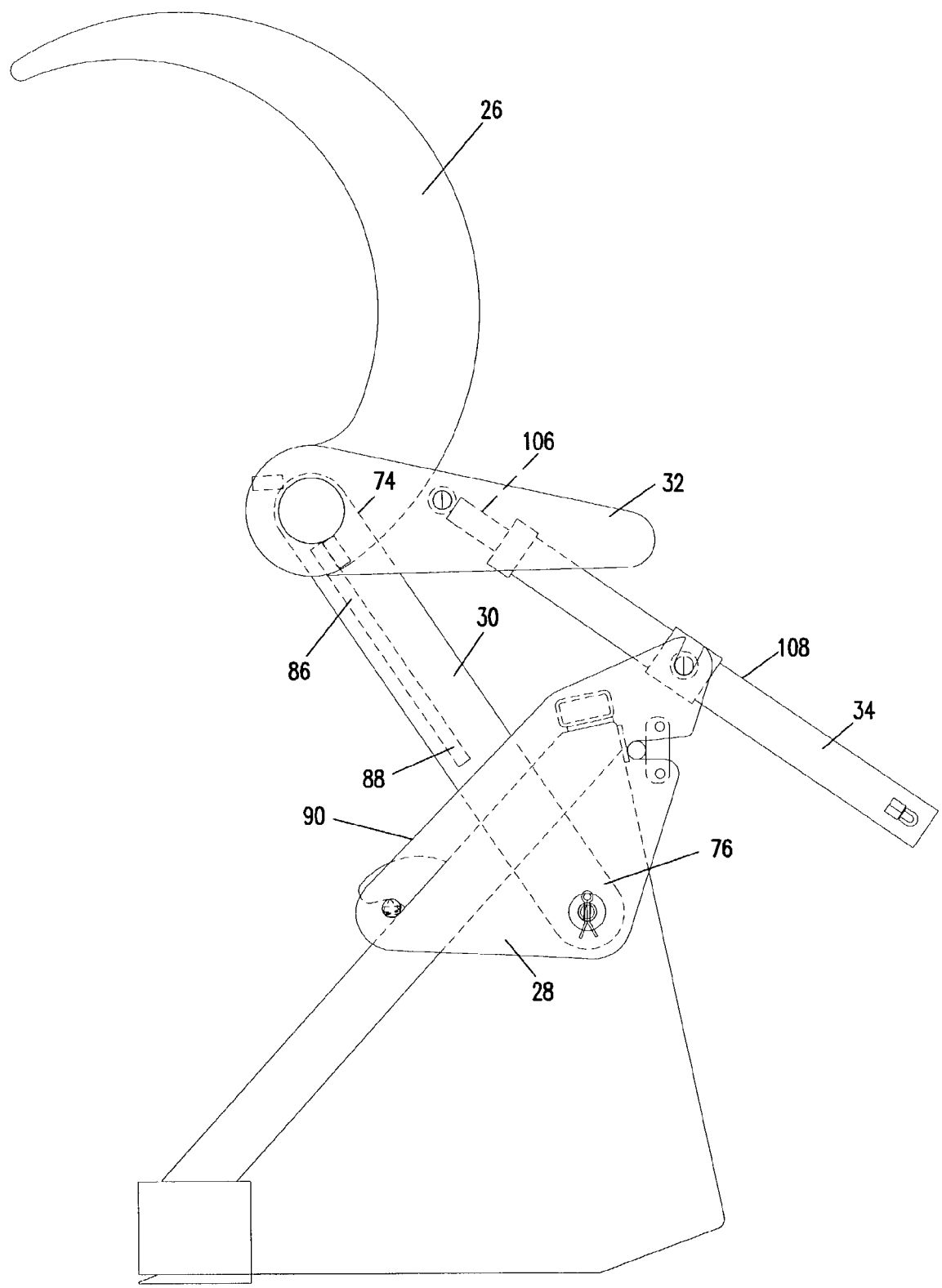
FIG. 2 is a side view of the double action grab fork of FIG. 1 shown during the first action.

Referring to FIG. 1, a double action grab fork according to the invention is shown at reference numeral 10. The double action grab fork 10 is shown attached to a pair of boom arms 12 and a pair of attachment hydraulic cylinders 13. The pair of boom arms 12 and the pair of attachment hydraulic cylinders 13 can be part of any material handling device such as a tractor or a skid steer loader. The boom arms and hydraulic cylinders for operating the double action grab fork according to the invention can be provided on a front end loader or on a rear end device or rear attachment device.

The double action grab fork 10 includes an upper grab member 14 and a lower grab member 16. The upper grab member 14 and the lower grab member 16 are constructed to move relative to each other to allow the upper grab member 14 and the lower grab member 16 to grab and hold any item that will fit between the upper grab member 14 and the lower grab member 16 such as a bale of hay. The movement of the upper grab member 14 and the lower grab member 16 can be characterized as having a first action movement and a second action movement. The first action can be referred to as a lever action, and the second action can be referred to as a rotation action. By providing both the lever action and the rotation action, the upper grab member 14 can be characterized as being capable of reaching out and grabbing an item and pulling the item into the lower grab member 16.

The double action grab fork 10 can include any structure having the upper grab member 14 and the lower grab member 16, and providing for a first action movement and a second action movement. For the double action grab fork 10 shown in FIG. 1, the upper grab member 14 is a part of a grab fork attachment assembly 18 and the lower grab fork member 16 is a bucket 20. It is an advantage of the invention that the grab fork attachment assembly 18, and the bucket 20 can be attached to provide the double action grab fork 10. The bucket 20 can be a conventional bucket or attachment used on a material handling apparatus and can be modified to accept the grab fork attachment assembly 18. Accordingly, the grab fork attachment assembly 18 can be considered a device that will attach to an existing bucket or attachment for a material handling apparatus to provide a double action grab fork according to the invention. Although it is an advantage of the invention to provide a structure where the upper grab member 14 can be separated from the lower grab member 16, it should be understood that the upper grab member 14 and the lower grab member 16 can be attached together in such a way that they are not generally considered to be separable.

The double action grab fork 10 includes an arm 22 having a first end 23 and a second end 24. The upper grab member 14 includes an upper grab end 15 and an upper grab body 19. The lower grab member 16 includes a lower grab end 17 and a lower grab body 21. The arm upper end 23 is rotatably attached to the lower grab body 19, and the arm lower end 24 is rotatably attached to the lower grab body 21.

The movement of the arm 22 relative to the lower grab member 16 can be characterized as a lever action of the upper grab member 14 relative to the lower grab member 16. The movement of the upper grab member 16 relative to the arm 22 can be characterized as a rotation action of the upper grab member 14 relative to the lower grab member 16.

The components of the upper grab member 14, the lower grab member 16, and the arm 22 are described in more detail in the context of the grab fork attachment assembly 18 and the bucket 20. The grab fork attachment assembly 18 can be constructed so that it fits onto any configuration of bucket. It should be understood that although a fairly common bucket configuration is shown by reference numeral 20, any bucket can be used in combination with the grab fork attachment assembly according to the invention.

Now referring to FIGS. 1-5, the operation of the double action grab fork 10 is shown. The grab fork attachment assembly 18 includes a grab teeth assembly 26, a frame assembly 28, a lever arm 30, and a rotation arm 32. A hydraulic cylinder 34 can be provided as part of the grab fork attachment assembly 18 or it can be provided as part of the material handling vehicle and added to the grab fork attachment assembly 18 in order to facilitate operation of the grab fork attachment assembly. In addition, the grab fork attachment assembly can include a support or stand 31 that allows for supporting the grab fork attachment assembly 18 during assembly or disassembly of the grab fork attachment assembly 18 from the bucket 20. Alternatively stated, the support or stand 31 supports the double action grab fork 10 and/or it supports the upper grab member 14 during assembly/disassembly to the lower grab member 16. The support or stand 31 can be provided as part of or as an extension of the rotation arm 32.

It should be understood that FIGS. 1-5 show the left side of the double action grab fork 10. In many cases, structure similar to that shown on the left side of the double action grab fork 10 is provided on the right side of the double action grab fork 10. When identical structure is provided on the left side and the right side, the structure on the left side will be represented by a reference number without an apostrophe, and the identical structure on the right side will be represented by the identical number with an apostrophe.

The grab teeth assembly 26 includes a teeth support 36 and a plurality of teeth 38 extending from the teeth support 36. The grab fork attachment assembly 18 can have a width that allows it to operate in combination with the bucket 20. In general, the width of the grab fork attachment assembly 18 can be about the same as the width of the bucket 20. It should be understood that the "width" refers to the distance from the left side to the right side. The view of the double action grab fork 10 shown in FIGS. 1-5 is a view of the left side. The grab teeth assembly 26 is provided extending from the left side to the right side. The frame assembly 28 can be provided extending from the left side to the right side. In contrast, the lever arm 30, the rotation arm 32, and the hydraulic cylinder 34 can be provided on both the left side and the right side.

The teeth support 36 extends across the width of the grab fork attachment assembly 18. The plurality of teeth 38 are provided along the teeth support 36 at spaced intervals. The teeth support 36 can be provided as a tube structure 40, and the plurality of teeth 38 can be attached thereto by welding. The plurality of teeth 38 can be provided having a shape that allows for wrapping around a cylindrical object such as a bale of hay. The shape of the plurality of teeth 38 can be described as arcuate when viewed from the side as shown in FIGS. 1-5.

The frame assembly 28 is provided for attaching the grab fork attachment assembly 18 to the bucket 20. The frame assembly 28 includes a support bracket 42, a bucket fastener 44, a frame assembly hydraulic cylinder connection 46, a frame assembly lever arm connection 48, and a cross member 49. Although not shown in FIGS. 1-5, the frame assembly 28 additionally includes a right support bracket, a right bucket fastener, a right frame assembly hydraulic cylinder connection, and a right frame assembly lever arm connection. The cross member 49 extends between the left support bracket 42 and the right support bracket (not shown) and holds them together.

The support bracket 42 is constructed so that the grab fork attachment assembly 18 can have sufficient structural integrity when it is attached to the bucket 20 and can operate properly in conjunction with the bucket 20. The support bracket 42 can be constructed so that it fits over the bucket exterior surface 53. The bucket fastener 44 is shown having a first fastener location 50 and a second fastener location 52. The first fastener location 50 is provided for attaching the support bracket 42 to the bucket front side 54. The second fastener location 52 is provided for attaching the support bracket 42 to the bucket backside 56. The first fastener location 50 is provided as a pin 57 attached to the support bracket 42. The pin 57 engages a hook bracket 58 extending from the bucket front side 54. The second fastener location 52 includes a gap 60 in the support bracket. The gap 60 receives a pin 62 attached to the bucket backside 56. A retainer 64 can be fastened in place by the fasteners 66 to hold the pin 62 within the gap 60.

Figure 3:
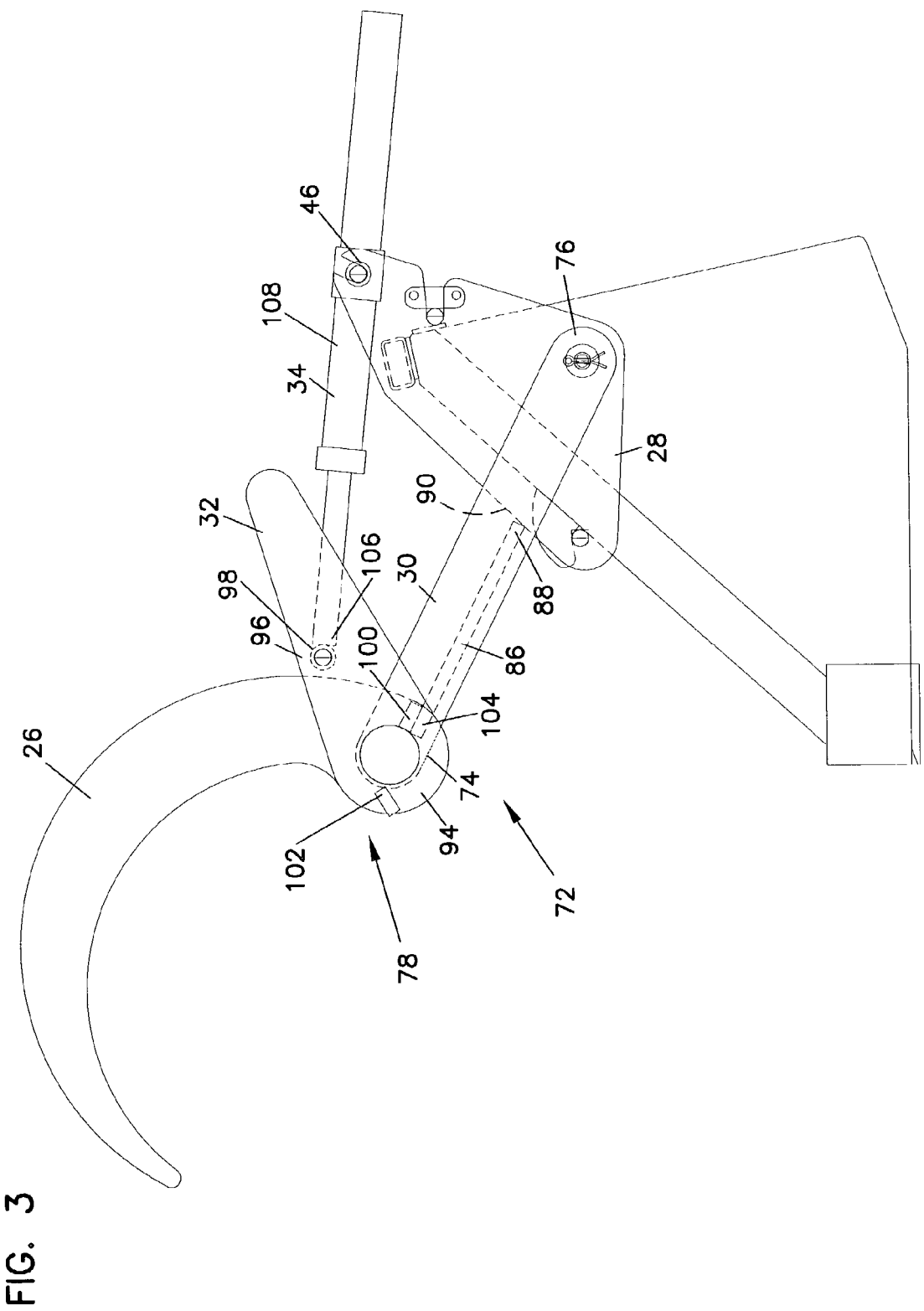
FIG. 3 is a side view of the double action grab fork of FIG. 1 shown at the end of the first action.
Figure 4:
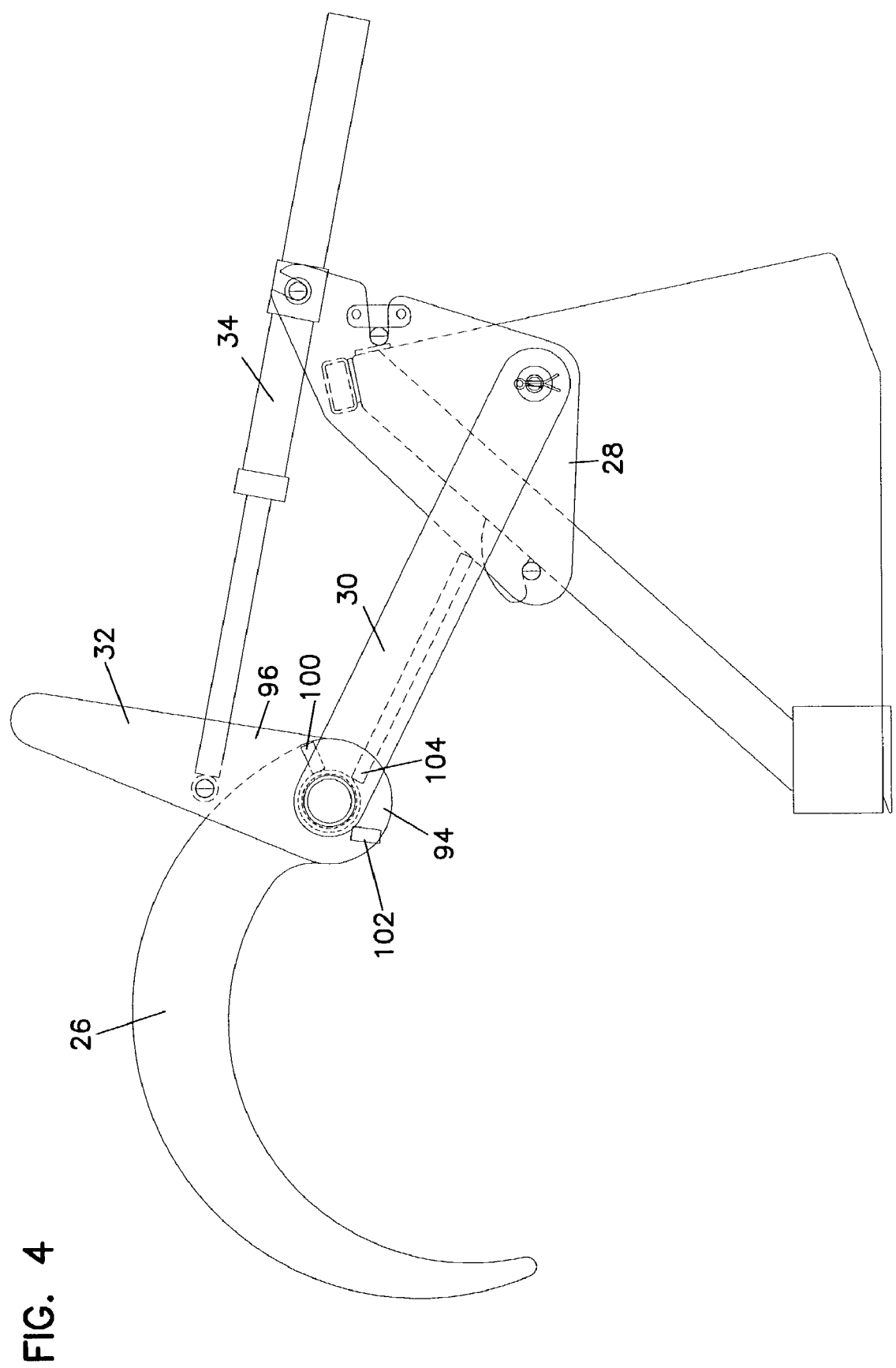
FIG. 4 is a side view of the double action grab fork of FIG. 1 shown during the second action.
Figure 5:
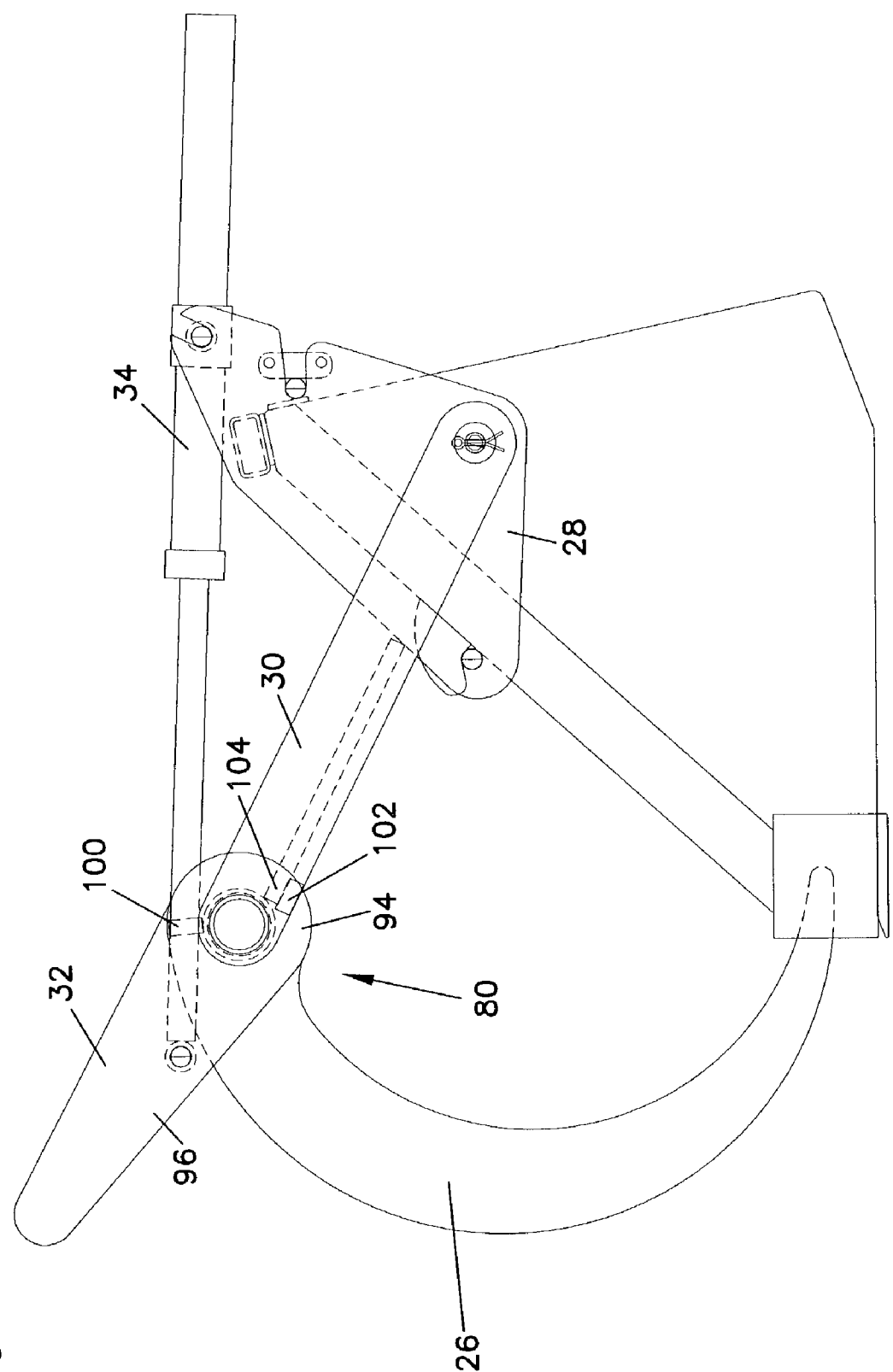
FIG. 5 is a side view of the double action grab fork of FIG. 1 shown at the end of the second action and provided in a closed position.

The lever arm 30 provides the grab fork attachment assembly 18 with a lever action when it moves between a first position 70 (as shown in FIG. 1) and a second position 72 (as shown in FIG. 3). The lever arm 30 includes a first lever arm end 74 and a second lever arm end 76. The first lever arm end 74 is rotatably attached to the teeth support 36. It should be understood that the phrase "rotatably attached" refers to the ability of the teeth support 36 to rotate relative to the first lever arm end 74. The second lever arm end 76 is rotatably attached to the support bracket 42 at the frame assembly lever arm connection 48, and allows the second lever arm end 76 to move relative to the support bracket 42. The frame assembly lever arm connection 48 can include a pin 82 about which the lever arm 30 rotates. The pin 82 can be attached to the support bracket 42 by, for example, welding, and the lever arm 30 can be held in place on the pin 82 by, for example, a washer 83 and a cotter pin 84.

The movement of the lever arm 30 between the first lever position 70 and the second lever position 72 can be controlled by the lever arm stop 86 provided along the lever arm 30. The lever arm stop 86 includes a lever action stop 88 that controls the movement of the lever arm between the first lever arm position 70 and the second lever arm position 72 by engaging the lever restricting surface 90 provided along the support bracket edge 92. As shown in FIG. 1, the lever action stop 88 engages the upper portion of the lever restricting surface 90 when provided in the first lever arm position 70. As shown in FIG. 3, the lever action stop 88 engages the lower part of the lever restricting surface 90 when provided in the second lever arm position 72. The combination of the lever action stop 88 and the lever restricting surface 90 causes the lever 30 to move between the first lever position 70 and the second lever position 72.

The rotation of the teeth support 36 relative to the first lever arm end 74 can be referred to as the rotation action of the grab fork attachment assembly 18. The rotation action moves between a first position 78 (shown in FIG. 3) and a second position 80 (shown in FIG. 5).

The rotation arm 32 includes a first rotation arm end 94 and a second rotation arm end 96. The first rotation arm end 94 attaches to the teeth support 36, and the second rotation arm end 96 includes a rotation arm hydraulic cylinder connection 98 for attaching the rotation arm 32 to the hydraulic cylinder 34. The first rotation arm end 94 can be welded to the teeth support 36. In addition, the rotation arm 32 includes a first rotation arm stop 100 and a second rotation arm stop 102. The first rotation arm stop 100 is provided so that it engages the rotation action stop 104 provided on the lever arm 30 when the grab fork attachment assembly 18 is provided in the first rotation arm position 78. Contact between the first rotation stop 100 and the rotation action stop 104 restricts opening of the grab teeth assembly 26. The second rotation arm stop 102 engages the rotation action stop 104 when the grab fork attachment assembly 18 is provided in the second rotation arm position 80. Contact between the second rotation arm stop 102 and the rotation action stop 104 restricts the movement of the grab teeth assembly 26 beyond the closed or second rotation arm position 80. Accordingly, the stops 100, 102, and 104 control the rotation of the grab teeth assembly 26 relative to the lever arm 30. It should be understood that the rotation arm 32 can be considered a part of the upper grab member 14 because of the attachment of the first rotation arm end 94 to the teeth support 36.

The hydraulic cylinder 34 includes a hydraulic cylinder first end 106 and a hydraulic cylinder second end 108. The hydraulic cylinder first end 106 attaches to the rotation arm 32 at the rotation arm hydraulic cylinder connection 98. The hydraulic cylinder second end 108 attaches to the frame assembly 28 at the frame assembly hydraulic cylinder connection 46. By extending the hydraulic cylinder 34, the first end 106 moves away from the second end 108. By retracting the hydraulic cylinder 34, the first end 106 moves toward the second end 108. The rotation arm hydraulic cylinder connection 98 and the frame assembly hydraulic cylinder connection 46 allow for rotation of the hydraulic cylinder 34.

As the hydraulic cylinder 34 extends, the lever action proceeds to move the grab fork attachment assembly 18 from the first lever arm position 70 to the second lever arm position 72. Once the second lever arm position 72 is achieved, the rotation arm action begins causing the grab fork attachment assembly 18 to move from the first rotation arm position 78 to the second rotation arm position 80. It should be understood that depending on the article that is being grabbed, the grab fork attachment assembly 18 may stop short of the second lever arm position 72 and/or the second rotation arm position 80. For example, a bale of hay may be sufficiently large in circumference to prevent the grab fork attachment assembly 18 from extending all the way to the second rotation arm position 80. When the hydraulic cylinder 34 is retracted, the movement of the grab fork attachment assembly 18 is reversed so that the rotation action precedes the lever action. As the hydraulic cylinder 34 is extended or contracted, the action or movement that is easiest precedes the action or movement that is more difficult. In the case of extending the hydraulic cylinder 34, the lever action precedes the rotation action in the configuration of the double action grab fork 10 shown in FIGS. 1-5.

The bucket 20 includes a left side wall 120, a back wall 122, a bottom wall 124, and a right wall (not shown). The bucket 20 includes bucket teeth 128 provided along the bucket leading edge 130. The bucket 20 has a general shape similar to many buckets commonly used and attached to material handling equipment. The bucket 20 has been modified to accept the grab fork attachment assembly 18. These modifications include the addition of the hook bracket 58 extending from the bucket front side 54, and the attachment of the pin 62 to the bucket backside 56. Exemplary bucket designs that can be used according to the invention include those bucket designs described in U.S. Pat. No. 6,374,520 to Westendorf et al. and U.S. patent application Ser. No. 09/639,039, the disclosures of which are incorporated herein by reference.

Figure 6:
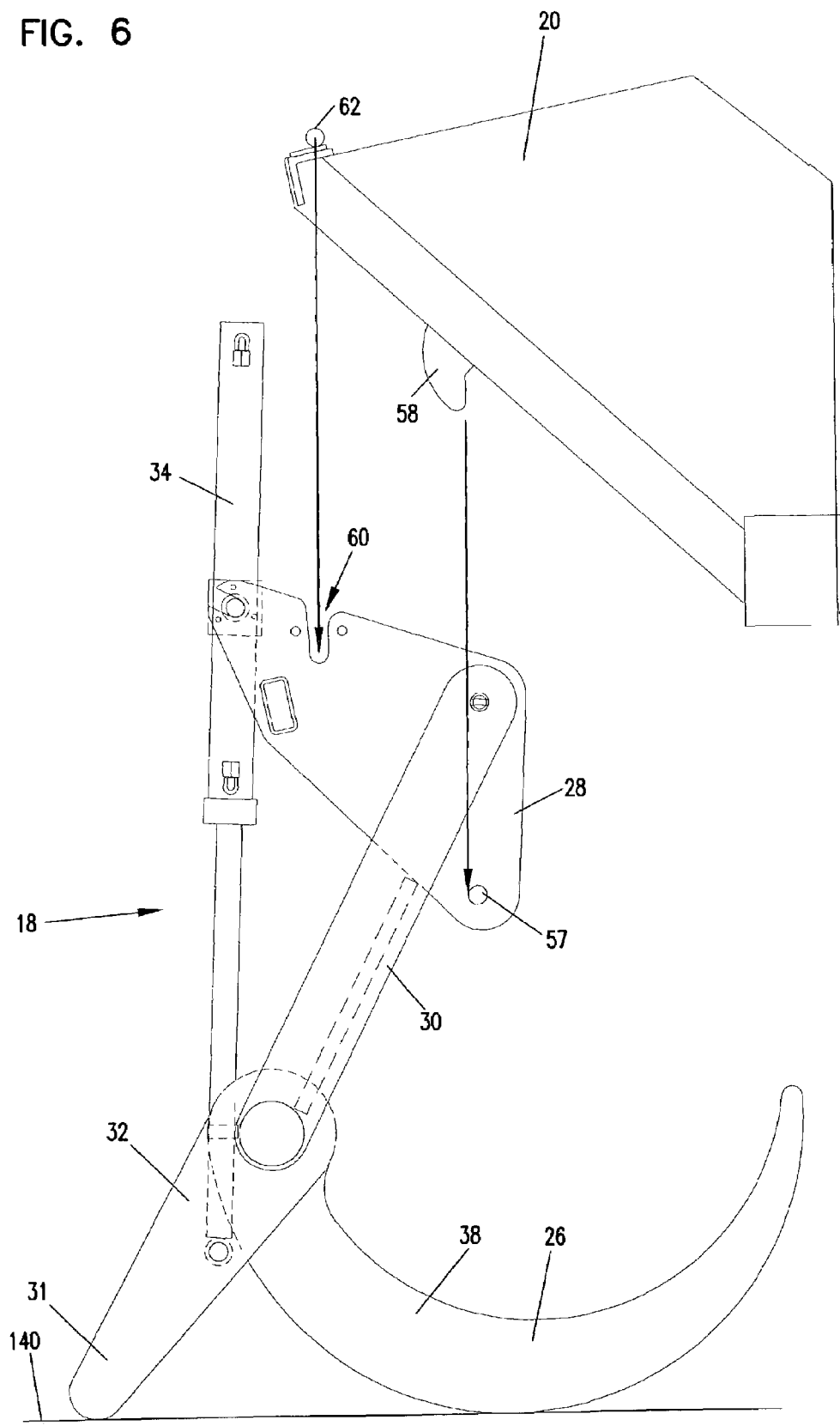
FIG. 6 is a side, assembly view of the double action grab fork of FIG. 1.
Figure 7:
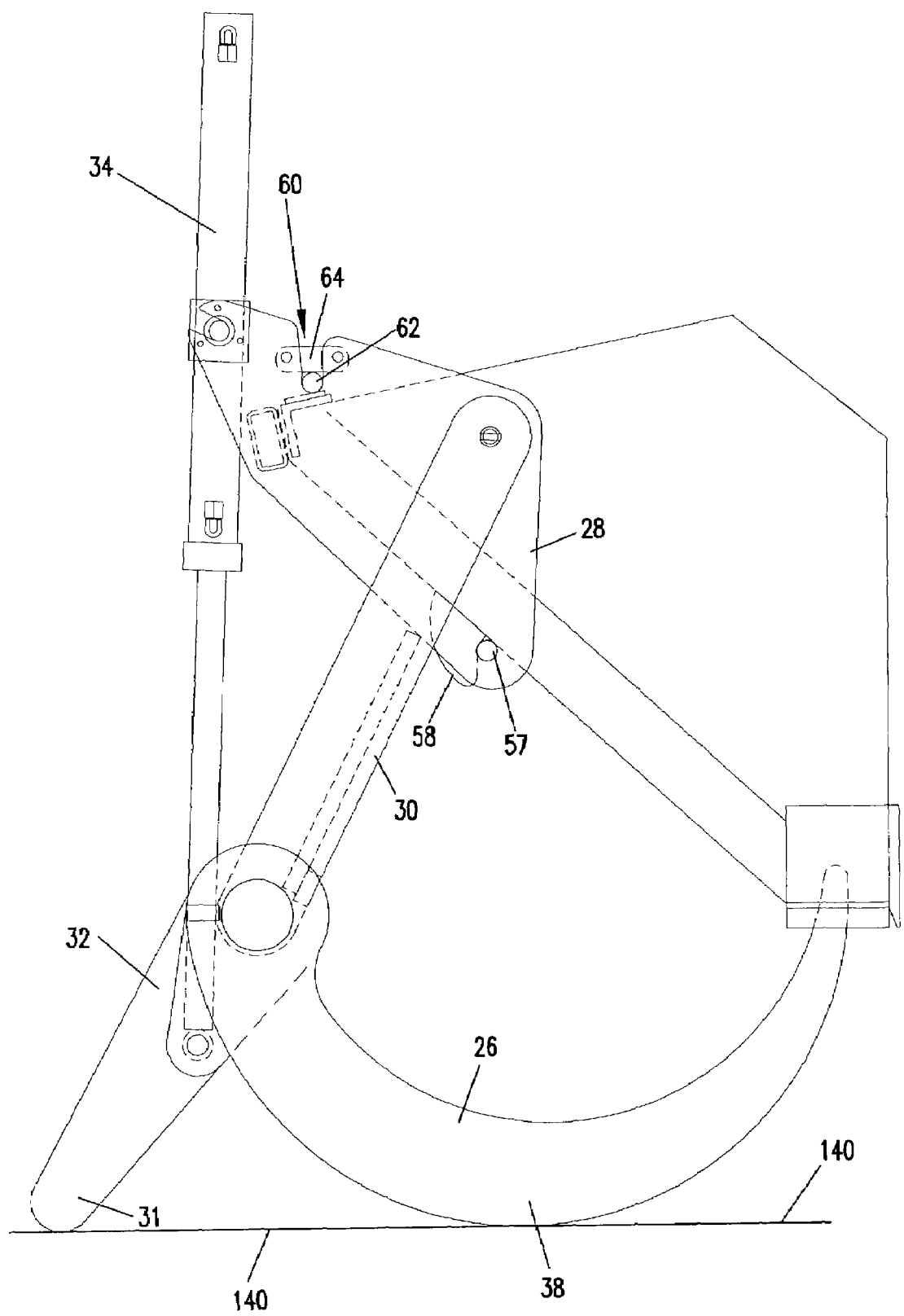
FIG. 7 is a side view of the double action grab fork of FIG. 1 provided in a storage position.

The assembly of the grab fork attachment assembly 18 and the bucket 20 is shown in FIGS. 6 and 7. The grab fork attachment assembly 18 is shown resting on the ground 140. The plurality of teeth 38 and the grab fork support or stand 31 hold the grab fork attachment assembly 18 steady. The grab fork support or stand 31 can be provided as part of the rotation arm 32 and extending away from the rotation arm to support the grab fork attachment assembly 18 when it is placed on the ground 140. As the bucket 20 is lowered onto the grab fork attachment assembly 18, the hook bracket 58 engages the pin 57, and the pin 62 engages the gap 60. In order to hold the bucket 20 to the grab fork attachment assembly 18, the retainer 64 is placed in order to lock the pin 62 within the gap 60.

Once the grab fork attachment assembly 18 is attached to the bucket 20, the double action grab fork 10 is available for use. Disassembly of the double action grab fork 10 can be accomplished by placing the double action grab fork 10 in the position shown in FIG. 7 where the grab fork support or stand 31 and the plurality of teeth 38 are resting on the ground 140. The retainer 64 can be removed and the bucket 20 can be separated from the grab fork attachment assembly 18. Although FIGS. 6 and 7 do not show a material handling apparatus attached to the bucket 20, it should be understood that a material handling apparatus can be attached to the bucket to facilitate movement of the bucket into and out of attachment to the grab fork attachment assembly 18.

Although the double action grab fork 10 is disclosed in FIGS. 1-7 in the context of a grab fork attachment assembly 18 that can be attached to a bucket 20, it should be understood that the double action grab fork 10 can include any structure whether considered permanently attached or detachable that includes an upper grab member 14 and a lower grab member 16 that move relative to each other to provide the described lever action and the described rotation action. For example, the lower grab member 16 need not be a bucket. Instead, the lower grab member 16 can be provided as any structure that may or may not have teeth that provides for an ability to work in conjunction with the upper grab member 14 to hold an article.

An advantage of the double action grab fork according to the invention is that it allows the upper grab member to reach out and draw material back into the lower grab member. When the lower grab member is a bucket, the upper grab member can reach out and draw articles or material into the bucket. This double action provides an ability to conveniently clean out material from a bunker silo. With the double action grab fork fully open and the bucket bottom wall 124 flat on the ground (as shown in FIG. 1), the bucket will reach the end of the silo before the grab fork teeth will contact a vertical wall at the end of the silo. The distance from the end of the grab teeth to the silo wall is shown in FIG. 1 as distance d. The double action also allows the upper grab member to reach into a silage bag and retrieve a full bucket of material.

Another advantage of the invention is that the first action and the second action can be controlled by a single lever. That is, the operator can use a single lever to cause the double action grab fork to move through the first action and then through the second action. The reason for this is that a single hydraulic cylinder (actually, a left hydraulic cylinder and a right hydraulic cylinder provided on the sides of the double action grab fork) causes the double action grab fork to move in both a first action and a second action. Accordingly, by controlling the hydraulic cylinder, the operator is able to control both the first action and the second action. In addition, the operator can use the same lever to cause the double action grab fork to reverse its motion and move through the second action and then through the first action.

The double action allows the operator to use the double action grab fork as a pincer. For example, the double action grab fork can be tilted so that it is facing downward, and then the double action grab fork can be used to pick up materials on the ground such as tree branches or broken bales.

Figure 8:
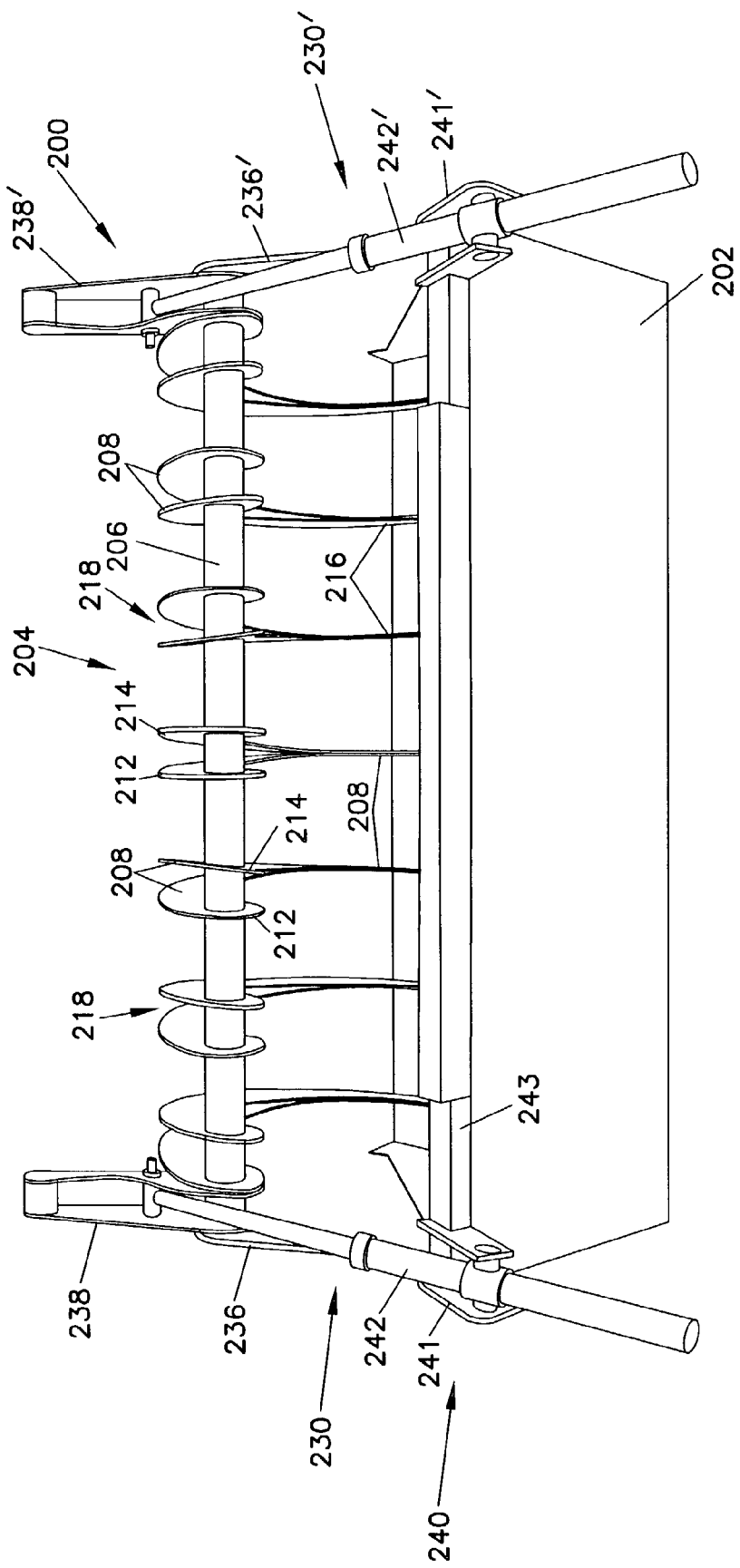
FIG. 8 is a top view of the double action grab fork and bucket of FIG. 1.

Now referring to FIG. 8, a grab fork attachment assembly 200 is shown attached to a bucket 202. The grab fork attachment assembly 200 includes a grab teeth assembly 204 having a teeth support 206 and a plurality of teeth 208. The plurality of teeth 208 are welded to the teeth support 206. Each of the teeth 208 can be provided as a pair of steel members 212 and 214 that are welded together at the teeth front end 216 and separated at the teeth back end 218. The pair of steel members 212 and 214 can be manufactured by laser cutting steel and then positioning the steel to weld the members together and to the teeth support 206. It is believed that by welding the pair of steel members 212 and 214 separately to the teeth support 206 and by attaching the steel members 212 and 214 together at the front end 216, it is expected that stronger teeth can be provided compared with teeth including steel members 212 and 214 that are not welded together.

The teeth 208 can be described as having a v-shape and being curved so that they provide a desired amount of strength against side pressure. The teeth can be designed out of two parts that are tapered toward the center. This allows for better penetration and maximum strength of the teeth. This also helps in covering more area when clamping and drawing into the bucket and to prevent material from falling out between the teeth.

As shown in FIG. 8, the grab fork 200 includes a left side 230 and a right side 230'. Included are the lever arms 236 and 236', the rotation arms 238 and 238', and the hydraulic cylinder 242 and 242', and the frame assembly 240 that includes support brackets 241 and 241' and a cross member 243.

Figure 9:
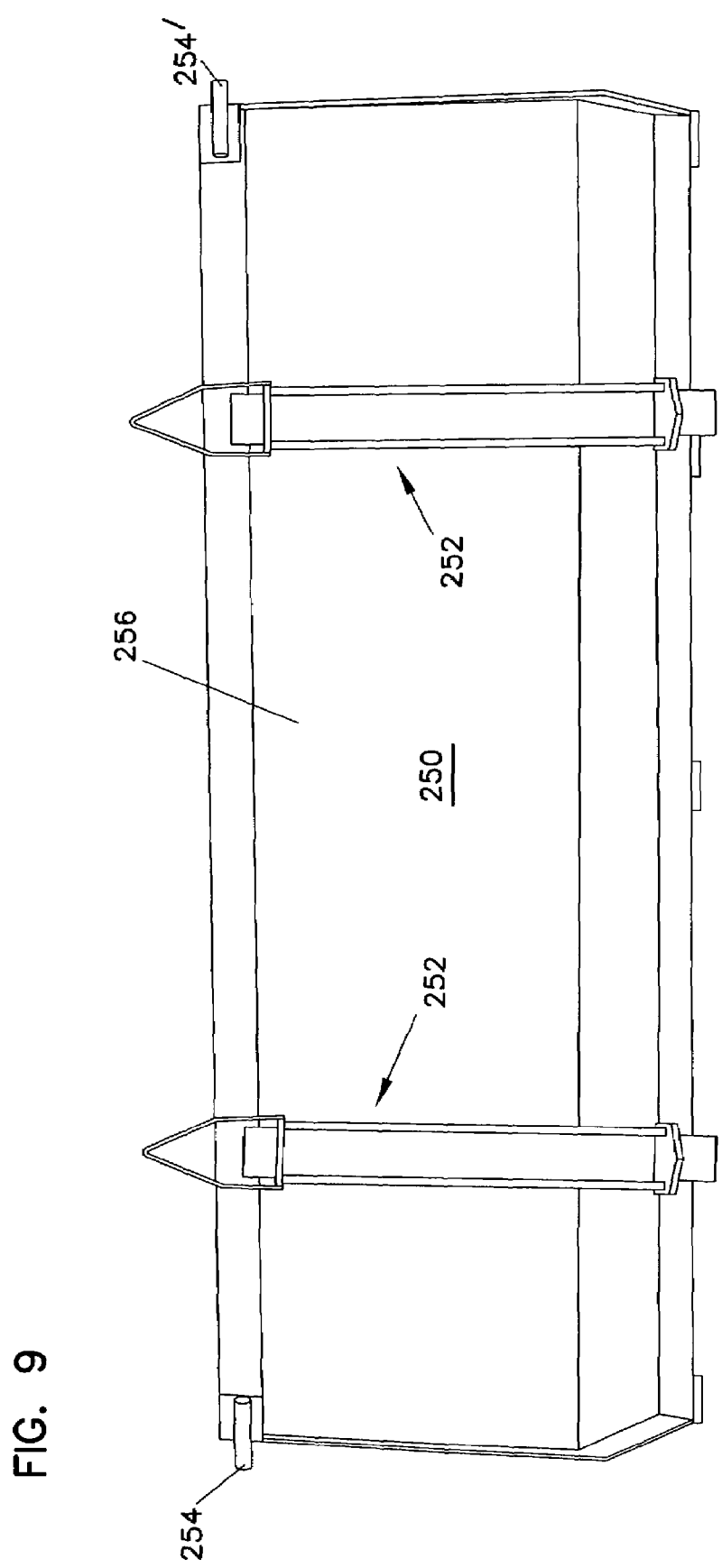
FIG. 9 is a rear view of the bucket of FIG. 1.

Now referring to FIG. 9, a bucket backside 250 having a quick attachment device 252. The quick attachment device 252 is described in U.S. Pat. No. 3,512,665 to Westendorf; U.S. Pat. No. 4,085,856 to Westendorf; U.S. Pat. No. 4,787,811 to Langenfeld et al.; U.S. Pat. No. 4,859,130 to Langenfeld et al.; U.S. Pat. No. 4,915,575 to Langenfeld et al.; and U.S. Pat. No. 4,968,213 to Langenfeld et al. The disclosures of these patents are incorporated herein be reference. The quick attachment device 252 is available for easy and quick attachment/detachment of the bucket to the boom arms of a front end loader. Additionally shown are pins 254 and 254' attached to the bucket backside 256 for attachment to a grab fork attachment assembly.

The above specification provides a complete description of the manufacture and use of the composition of the invention. Since many embodiments of the invention can be made without departing from the spirit and scope of the invention, the invention resides in the claims hereinafter appended.

We claim:

1. A double action grab fork comprising:
  (a) upper grab member having an upper grab end and an upper grab body;
  (b) lower grab member having a lower grab end and a lower grab body, wherein the upper grab member is not directly attached to the lower grab member;
  (c) arm having an upper end and a lower end, wherein:
    (i) the upper end of the arm is rotatably attached to the upper grab body to allow rotation of the upper grab member relative to the upper end of the arm; and
    (ii) the lower end of the arm is rotatably attached to the lower grab body to allow rotation of the lower grab body relative to the lower end of the arm;
  (d) hydraulic cylinder attached to the upper grab member and the lower grab member, wherein the upper grab member, the lower grab member, and the arm are constructed to move through a lever action and a rotation action as a result of extension or refraction of the hydraulic cylinder, wherein the lever action results by rotating the arm relative to the lower grab member, and the rotation action results by rotating the upper grab member relative to the arm;
  (e) a rotation arm having a first rotation arm end and a second rotation arm end, the first rotation arm end being non-rotatably attached to the upper grab body, and the second rotation arm end comprising a rotation arm hydraulic cylinder connection for attaching the rotation arm to the hydraulic cylinder; and (f) wherein the combination of the lever action and the rotation action allows the upper grab member to reach out and draw material into the lower grab member.

2. A double action grab fork according to claim 1, further comprising:

(a) second arm having an upper end and a lower end, wherein:
   (i) the upper end of the second arm is rotatably attached to the upper grab body to allow rotation of the upper grab member relative to the upper end of the second arm; and
   (ii) the lower end of the second arm is rotatably attached to the lower grab body to allow rotation of the lower grab body relative to the lower end of the second arm; and (b) second hydraulic cylinder attached to the upper grab member and the lower grab member, wherein the upper grab member, the lower grab member, and the second arm are constructed to move through a lever action and a rotation action as a result of extension or refraction of the second hydraulic cylinder, wherein the lever action results by rotating the second arm relative to the lower grab member, and the rotation action results by rotating the upper grab member relative to the second arm.

3. A double action grab fork according to claim 1, wherein the hydraulic cylinder comprises a first hydraulic cylinder end and a second hydraulic cylinder end, the first hydraulic cylinder end being attached to the rotation arm hydraulic cylinder connection, and the second hydraulic cylinder end being attached to the lower grab body.

4. A double action grab fork according to claim 1, wherein the arm comprises a lever action stop and a rotation action stop provided on the arm, and the rotation arm comprises a first rotation arm stop and a second rotation arm stop provided on the rotation arm.

5. A double action grab fork according to claim 4, wherein the rotation action stop, the first rotation arm stop, and the second rotation arm stop are constructed to restrict rotation of the upper grab member relative to the arm.

6. A doable action grab fork according to claim 5, wherein the lever action stop is constructed to interact with the lower grab member to restrict movement of the arm relative to the lower grab member.

7. A double action grab fork according to claim 1, wherein the lower grab member comprises a bucket, and the upper grab member, the arm, and the hydraulic cylinder forms a grab fork attachment assembly constructed to attach to the bucket.

8. A double action grab fork assembly and bucket for use on a front end loader, the grab fork comprising:

(a) grab teeth assembly comprising:
   (i) teeth support constructed to rotate between a first position and a second position; and
   (ii) plurality of teeth extending from the teeth support;

(b) frame assembly comprising:
   (i) bucket fastener connecting the frame assembly to the bucket; and
   (ii) frame assembly hydraulic cylinder connection;

(c) lever arm having a first lever arm end and a second lever arm end, the first lever arm end being rotatably attached to the teeth support, and the second lever arm end being rotatably attached to the frame assembly;

(d) rotation arm having a first rotation arm end and a second rotation arm end, the first rotation arm end being non-rotatably attached to the teeth support, and the second rotation arm end comprising a rotation arm hydraulic cylinder connection; and (e) hydraulic cylinder attached to the frame assembly hydraulic cylinder connection and the rotation arm hydraulic cylinder connection, wherein the double action grab fork assembly is constructed to move through a lever action and a rotation action, wherein the lever action results by rotating the lever arm relative to the frame assembly, and the rotation action results by rotating the grab teeth assembly relative to the lever arm, and the combination of the lever action and the rotation action allows the plurality of teeth to reach out and draw material into the bucket, and wherein the grab teeth assembly does not directly attach to the bucket.

9. A double action grab fork according to claim 8, wherein the:
   hydraulic cylinder comprises a first hydraulic cylinder end and a second hydraulic cylinder end, the first hydraulic cylinder end being attached to the rotation arm hydraulic cylinder connection, and the second hydraulic cylinder end being attached to the frame assembly hydraulic cylinder connection.

10. A double action grab fork assembly according to claim 8, wherein the lever arm comprises a lever arm stop on the lever arm for controlling movement of the lever arm between a first lever arm position and a second lever arm position.

11. A double action grab fork assembly according to claim 8, wherein the teeth support comprises a first rotation stop and a second rotation stop on the teeth support for controlling movement of the teeth support between a first position and a second position.

12. A double action grab fork according to claim 8, wherein the teeth comprise a pair of teeth members, each member having a first end and a second end, the first ends being attached together and the second ends being separated and attached to the teeth support.

13. A method for using a double action grab fork, the method comprising a step of:
   extending a hydraulic cylinder to move the double action grab fork attached to a bucket between an open position and a closed position, the double action grab fork comprising:

(a) grab teeth assembly comprising:
   (i) teeth support constructed to rotate between a first position and a second position; and
   (ii) plurality of teeth extending from the teeth support;

(b) frame assembly comprising:
   (i) bucket fastener connecting the frame assembly to a bucket; and
   (ii) frame assembly hydraulic cylinder connection;

(c) lever arm having a first lever arm end and a second lever arm end, the first lever arm end being rotatably attached to the teeth support, and the second lever arm end being rotatably attached to the frame assembly;

(d) rotation arm having a first rotation arm end and a second rotation arm end, the first rotation arm end being non-rotatably attached to the teeth support, and the second rotation arm end comprising a rotation arm hydraulic cylinder connection; and (e) the hydraulic cylinder having a first hydraulic cylinder end and a second hydraulic cylinder end, the first hydraulic cylinder end being attached to the rotation arm hydraulic cylinder connection, and the second hydraulic cylinder end being attached to the frame assembly hydraulic cylinder connection, and wherein the grab teeth assembly does not directly attach to the bucket; and wherein the step of extending the hydraulic cylinder provides the double action grab fork to move through a lever action and a rotation action so that the plurality of teeth reach out and draw material into the bucket.

14. A method according to claim 13, further comprising a step of retracting the hydraulic cylinder to cause the double action grab fork to move between the closed position and the open position.

15. A method according to claim 13, wherein the lever arm comprises a lever arm stop on the lever arm for controlling movement of the lever arm between a first lever arm position and a second lever arm position.

16. A method according to claim 14, wherein the teeth support comprises a first rotation stop and a second rotation stop on the teeth support for controlling movement of the teeth support between a first position and a second position.

* * * * *